US007003800B1

(12) United States Patent
Bain

(10) Patent No.: US 7,003,800 B1
(45) Date of Patent: Feb. 21, 2006

(54) SELF-DECRYPTING WEB SITE PAGES

(76) Inventor: Ralph Victor Bain, 39908 San Simeon Ct., Fremont, CA (US) 94539-3619

(*) Notice: Subject to any disclaimer, the term of this patent is extended or adjusted under 35 U.S.C. 154(b) by 783 days.

(21) Appl. No.: 09/707,225

(22) Filed: Nov. 6, 2000

(51) Int. Cl.
G06F 7/04 (2006.01)

(52) U.S. Cl. ........................... 726/28; 726/26; 726/27; 726/29; 713/183

(58) Field of Classification Search ................ 713/201, 713/200
See application file for complete search history.

(56) References Cited

U.S. PATENT DOCUMENTS

| | | | | |
|---|---|---|---|---|
| 5,751,813 | A * | 5/1998 | Dorenbos | 713/153 |
| 5,765,176 | A * | 6/1998 | Bloomberg | 715/514 |
| 5,809,144 | A * | 9/1998 | Sirbu et al. | 705/53 |
| 5,848,161 | A * | 12/1998 | Luneau et al. | 705/78 |
| 5,898,836 | A * | 4/1999 | Freivald et al. | 709/218 |
| 5,907,621 | A * | 5/1999 | Bachman et al. | 713/155 |
| 5,933,829 | A * | 8/1999 | Durst et al. | 707/10 |
| 5,974,550 | A * | 10/1999 | Maliszewski | 713/200 |
| 5,983,247 | A * | 11/1999 | Yamanaka et al. | 715/526 |
| 6,023,764 | A * | 2/2000 | Curtis | 713/200 |
| 6,105,012 | A * | 8/2000 | Chang et al. | 705/64 |
| 6,112,192 | A * | 8/2000 | Capek | 705/59 |
| 6,226,642 | B1 * | 5/2001 | Beranek et al. | 707/10 |
| 6,253,326 | B1 * | 6/2001 | Lincke et al. | 713/201 |
| 6,457,030 | B1 * | 9/2002 | Adams et al. | 715/523 |
| 6,546,554 | B1 * | 4/2003 | Schmidt et al. | 717/176 |
| 6,728,378 | B1 * | 4/2004 | Garib | 380/259 |
| 6,880,083 | B1 * | 4/2005 | Korn | 713/170 |
| 2001/0027441 | A1 * | 10/2001 | Wankmueller | 705/41 |
| 2002/0184485 | A1 * | 12/2002 | Dray et al. | 713/150 |

OTHER PUBLICATIONS

Single U.S. Appl. No. 60/240,565.*

* cited by examiner

Primary Examiner—Ayaz Sheikh
Assistant Examiner—Pramila Parthasarathy

(57) ABSTRACT

A web site contains a process which allows visitors to the site to view sensitive information contained in cryptograms in the site pages. During the site visit, controlling and key handling functions within the process automatically give the visitor an opportunity to enter keys to identify certain cryptograms in the site pages that the visitor is authorized to display. When pages containing the identified cryptograms are downloaded during the site visit, a decryption function within the process displays decrypted versions of those cryptograms in a seamless, sequential presentation along with standard page contents. At all times while pages are transmitted, stored, handled by network servers, or processed and displayed by a browser, the sensitive information in the site pages remains in cryptographic form.

5 Claims, 12 Drawing Sheets

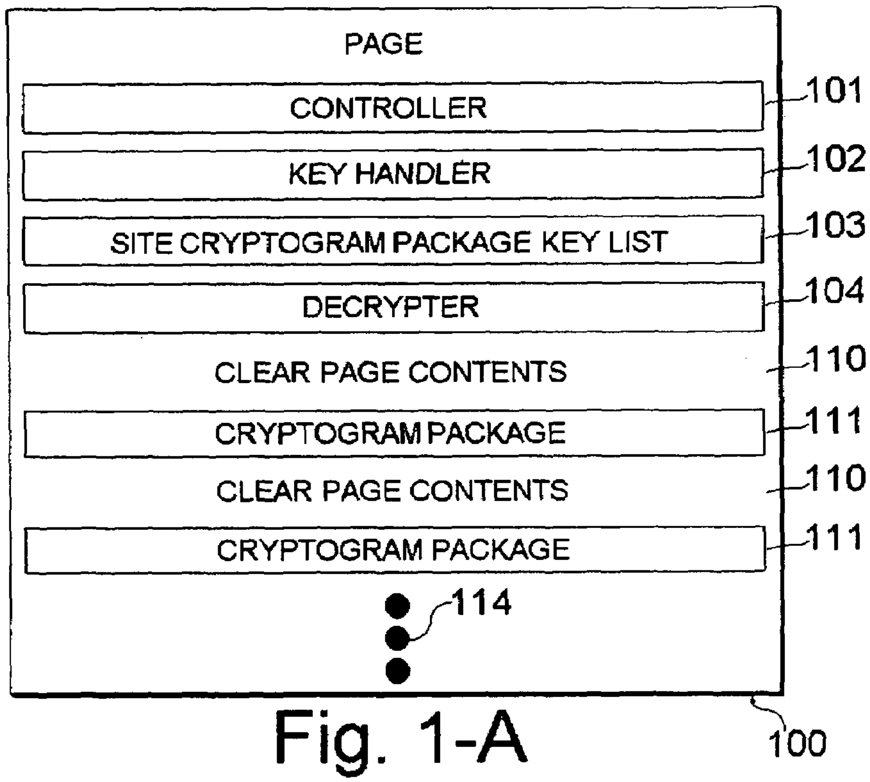
Fig. 1-A
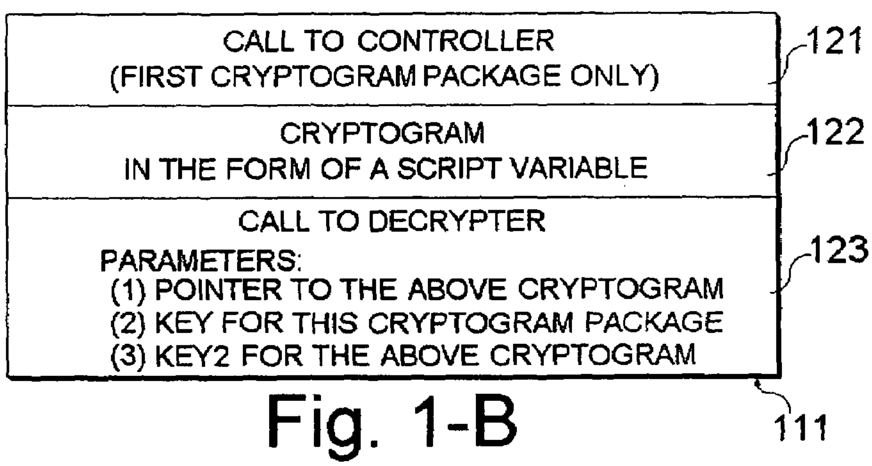
Fig. 1-B
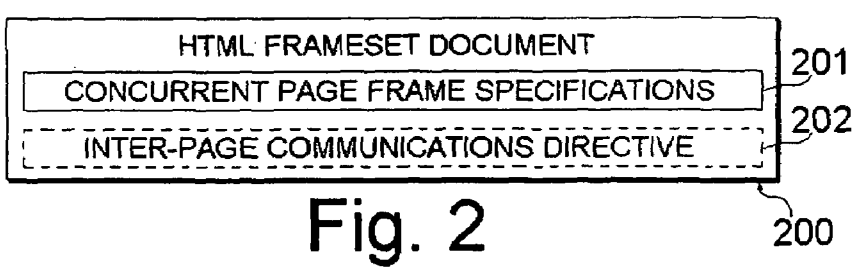
Fig. 2

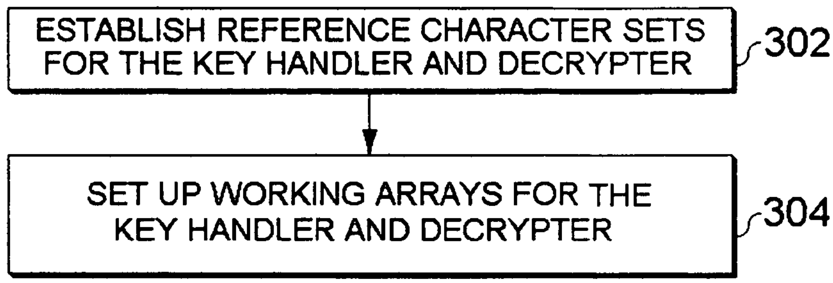
Fig. 3-A
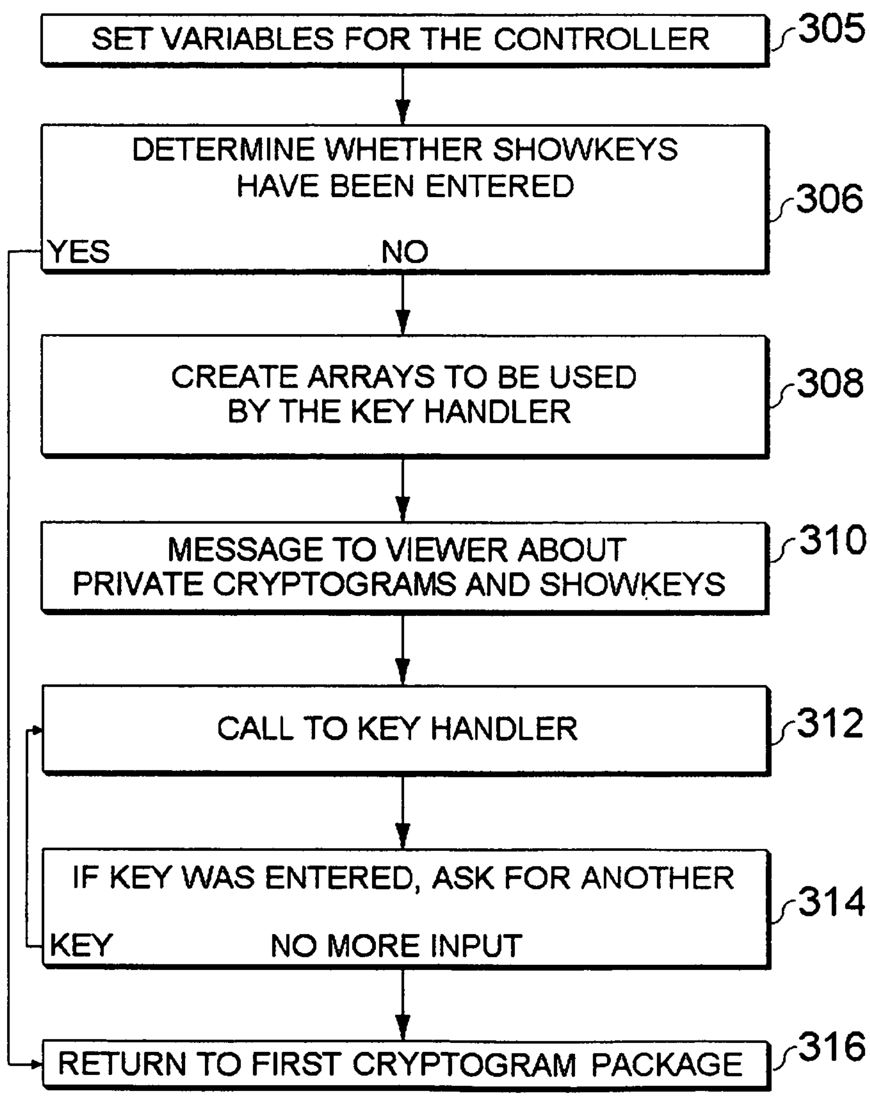
Fig. 3-B

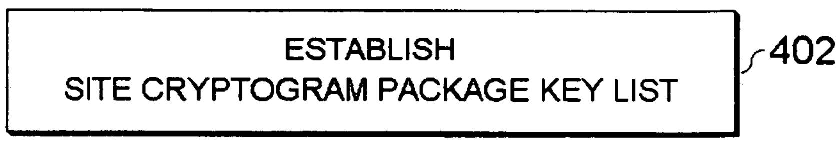
Fig. 4-A
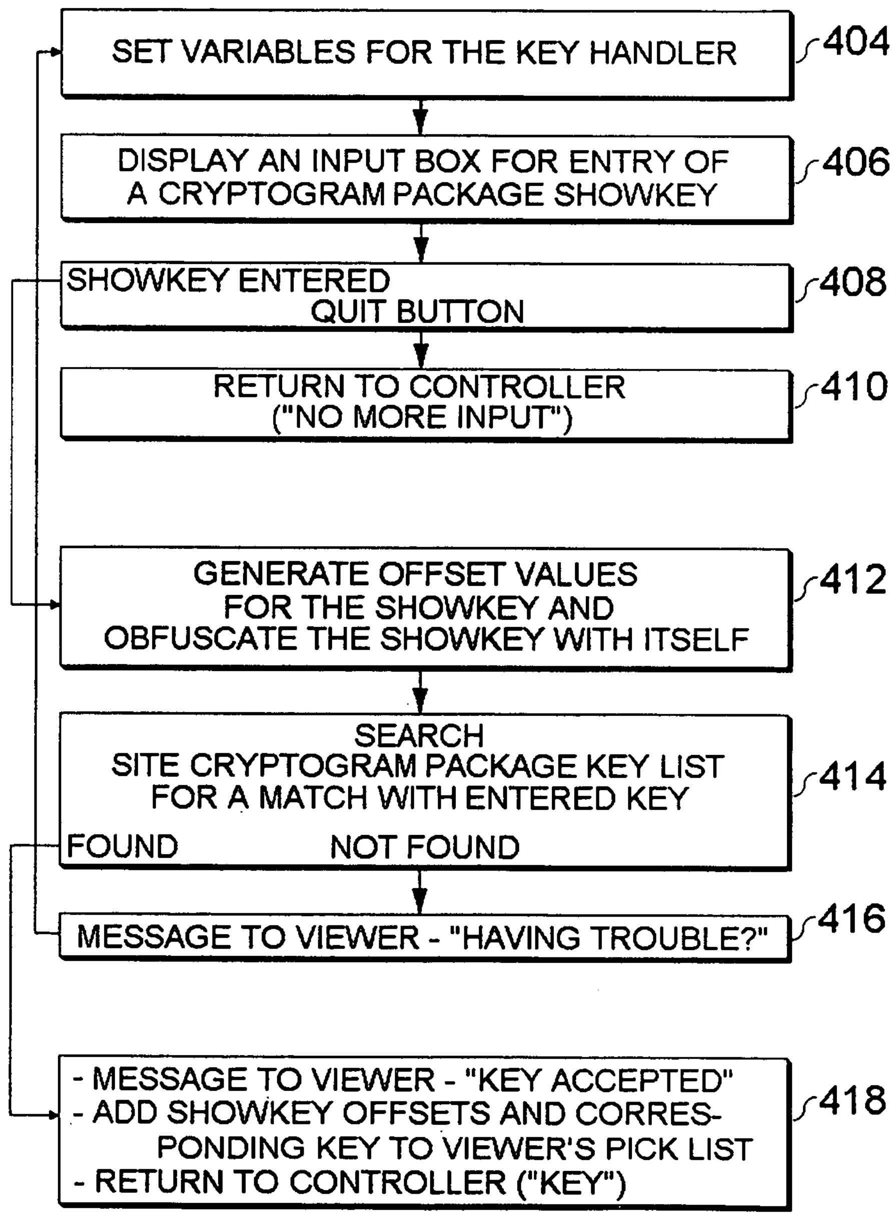
Fig. 4-B

```
<script language="JavaScript">

//************************* 302 **************************
var cryp0cl1=' !"#$%&æ()*+,-
./0123456789:;<=>?@ABCDEFGHIJKLMNOPQRSTUVWXYZ[ç]^_`abcdefghijklmn
opqrstuvwxyz{|}~' + "\\'";
var cryp0enc=" !ê#$%&æ()*+,-
./0123456789:;ë=ì?@ABCDEFGHIJKLMNOPQRSTUVWXYZ[ç]^_`abcdefghijklmn
opqrstuvwxyz{|}~èé";
var cryp0clr=cryp0cl1 + cryp0cl1 + cryp0cl1;

//************************* 304 **************************
var crypb= new Array();
var crypb2= new Array();

//************************* 305 *************************
//********************** CONTROLLER *********************
function cryp00x1() {
var i=0;
var pass="X";
var msg="This site's pages contain some PRIVATE segments.
Entering ViewKeys now will\nunlock key-matched segments for
display along with with regular page contents.\n\n       Masked
Pages selective decryption - Copyright © 2000 Ralph V. Bain";

//*********************** 306,316 ***********************
if (top.crypeks!=null){
     return;
}
```

Fig. 7-A

```
//************************ 308 *************************
top.crypeks= new Array("empty");
top.cryposets= new Array();

//************************ 310 *************************
alert(msg);

//******************** 312,314,316 *********************
while(pass!=null) {
     pass=cryp00x3(i);
     i++;
}
}

//************************ 402 *************************
var crypemks= new Array("/*/!`tx3","Bfu9e}d&","|B;B,cqc",
"æf*eP!9&");

//************************ 404 *************************
//******************* KEY HANDLER *******************
function cryp00x3(i) {
var cpass="";
var bias=0;
var j;
var k=0;
var msg1="Please type in a single VIEWKEY and click OK.\nWhen
done entering the key(s) you wish to use for this web site, click
CANCEL.";

//************************ 406 *************************
pass=window.prompt(msg1," ");

//************************ 408 *************************
if (pass==null) {

//************************ 410 *************************
return pass;
}
```

Fig. 7-B

```
//************************* 412 **************************
for(j=0; j<pass.length; j++) {
     crypb[j]=cryp0clr.indexOf(pass.charAt(j))*4*(j+1)+(j+1);
bias=bias+crypb[j]*(j+1);
}
for(j=0; j<pass.length; j++) {
     crypb[j]=(crypb[j]+bias) % cryp0enc.length;
}
for(j=0; j<pass.length; j++) {
     cpass+=cryp0enc.charAt((cryp0clr.indexOf(pass.charAt(j))-
crypb[j]+2*cryp0enc.length) % cryp0enc.length);
}

//************************* 414 *************************
pass="***";
j=-1;
for(k=0; k<crypemks.length; k++) {
     if(cpass==crypemks[k]) {
          j=k;
     }
}

//************************* 416 *************************
if (j==-1){
     alert("\nYou are apparently having trouble with the VIEWKEY.
The one you entered is not used on this website.\n\nIf you need
help, contact the site owners.\n\n              Please click the
OK button to either try another viewkey, or cancel.");
     cryp00x3(i);
     return pass;
}

//************************* 418 *************************
else {
     alert("VIEWKEY ACCEPTED");
     top.crypeks[i]=cpass;
     k=0;
     for(j=i*8; j<i*8+8; j++,k++) top.cryposets[j]=crypb[k];
     return pass;
}
}
```

Fig. 7-C

```
//************************ 502 ***************************
//********************* DECRYPTER ************************
function cryp00x2(cryptxt,ekey,key2) {
var pbx=0;
var pbx2=0;
var iterate=0;
var i;
var j=-1;
var k=0;
var str="";
var c2;
var cb= new Array();
var cb2= new Array();

//********************** 504,512 ************************
for(i=0; i<top.crypeks.length; i++) {
     if(top.crypeks[i]==ekey) {
          j=i;
     }
}
if(j==-1) {
return;
}

//************************ 506 ***************************
k=0;
for(i=j*8; i<j*8+8; i++,k++) crypb[k]=top.cryposets[i];
for(k=0; k<121; k++) {
     c2=cryp0clr.charAt(cryp0enc.indexOf(key2.charAt(k))+crypb[k
% 8]);
     crypb2[k]=cryp0clr.indexOf(c2);
}

//************************ 508 ***************************
for (i=0; i<64; i++) cb[i]=crypb2[i];
for (i=0; i<57; i++) cb2[i]=crypb2[i+64];
for (i=0; i<8; i++) cb2[i+57]=crypb[i];
```

Fig. 7-D

```
//********************** 510,512 *************************
for(iterate=0; iterate<cryptxt.length-1000; iterate+=1000){
     for(j=iterate; j<iterate+1000; j++, pbx=j % 64, pbx2=j % 65)
{
          str+=cryp0clr.charAt(cryp0enc.indexOf(cryptxt.charAt(j)
)+cb[pbx]+cb2[pbx2]);
     }
document.write(str);
str="";
}
for(j=iterate; j<cryptxt.length; j++, pbx=j % 64, pbx2=j % 65) {
     str+=cryp0clr.charAt(cryp0enc.indexOf(cryptxt.charAt(j))+cb[
pbx]+cb2[pbx2]);
}
document.write(str);
return;
}

//########## END OF JAVASCRIPT FUNCTION SECTION ##########
</script>

<!-- ################ START PAGE SECTION ########%##### -->

<html>
<head>
<meta http-equiv="Content-Type"
content="text/html; charset=iso-8859-1">
<meta name="GENERATOR" content="Microsoft FrontPage Express 2.0">
<title>all tarton</title>
</head>

<body background="tartan3.gif" bgcolor="#FFFFd8">

<p><img src="the.gif" width="60" height="40"><br>
<img src="bains.gif" width="220" height="90"></p>

<center>

<h1><font color="#CFD332">Click-a-Visit</font></h1>
<a href="misral.htm" target="frame2"><font
face="Arial, Helvetica" COLOR="#82E1E4"><strong>Missy &
Ralph<br></strong></font></a>
```

```
<br>

<!--****************** 121-122-123 ******************-->
<!--***************** CRYPTOGRAM PACKAGE **************-->
<script language="JavaScript">
cryp00x1();
var cryptxt1=
"Uwsm`:0{mdw^]](tIrT1)1;I[z=w4Cdd_mSUz^@@m+wì%æQè7ç-
&jcd6)3ç73Cé(-
4M%xNip(#61g8gOa}`;T@z3QjEëJ4asfæ/YPD~h)çTILR+ob[Od*NdpsK?6+WuRn7
7ç)kTPc";
cryp00x2(cryptxt1,"Bfu9e}d&","Pwê`;[:qtêLH:DCy ←space
yAU%%d5`sCNlcdéQ:j{rdZêf1xFëF~,Eld[EN2Zæz/æ)Sék;ZoXXUzQ}GC_hGu_$(
!*_BTYw%æS(U~eqqKgêU!zçç(@/lt0 fS4E(Us/");
</script>
<!--*********** END OF CRYPTOGRAM PACKAGE ***********-->

<br>

<!--******************** 122-123 ********************-->
<!--****************** CRYPTOGRAM PACKAGE *************-->
<script language="JavaScript">
var cryptxt2= "YAV;76~EnK,PA=JWêiAz2S*$5Yf._=$&/3Biêvc^FK@Wì{jI-
~[pVmkeìub[KVè &_-ì]*gY)NbA^!1*=rn]K#j-^kNy&è`wGlì|ak588rLæHR
F5*+I))QVFjTWêsDv6%fE[baèv)6B[æF31P5P_Ldç%I";          space↑
cryp00x2(cryptxt2,"|B;B,cqc","1pN=!Ode-
wDgt)zThHBiJêjWLë+jêm6B58%%?{7ST6m;nN4H ←space
~^êëKOKlM*4IJue,OIdl!.Ks$éfC:PPu{}F(@*ua5`7ìnV8me)`CCMDEPSJë-
pc`Ku;Yì]1G");
</script>
<!--********** END OF CRYPTOGRAM PACKAGE ************-->

<br>

<a href="bainf2.htm" target="frame2"><font
face="Arial, Helvetica" COLOR="#82E1E4"><strong>Heritage
Page</strong></font></a>

<br>

</body>
</html>
```

Fig. 7-F

```
<!--***************** 200-202-204 ********************-->
<!--************* HTML FRAMESET DOCUMENT ***************-->
<HTML>
<HEAD>
</HEAD>
<FRAMESET ROWS="100%,*" BORDER=0>
     <FRAME SRC="xfig7.htm">
</FRAMESET>
</HTML>
```

Fig. 7-G

SELF-DECRYPTING WEB SITE PAGES

CROSS-REFERENCE TO RELATED APPLICATIONS

Not applicable.

FEDERALLY SPONSORED RESEARCH OR DEVELOPMENT

Not applicable.

MICROFICHE APPENDIX

Not Applicable.

BACKGROUND

1. Field of Invention

This invention relates to network web sites, specifically to their use for securely distributing sensitive information over networks such as the Internet.

2. Prior Art

The evolution of electronic networks and networking devices has included the continued development and refinement of the documents that are transmitted over the networks. Of major importance has been the introduction of syntax and format standards for creating information documents. The most popular of these is called hypertext markup language ("HTML"). The HTML standards dictate the way that document creators "mark up" the text in a document to control the way it is displayed when downloaded to a viewer of that document. Such a document is usually called a "page". The HTML standards also specify how a collection of related pages might interact when they are downloaded from the same location in a network server, usually called a "web site".

The above developments in documents have, of necessity, gone hand-in-hand with the development of software programs that locate web sites, download their pages, and display them on site visitor's systems. Such a program is called a "browser". The use of the browser to download and display HTML pages from a web site has been established as the most popular method for distributing information over networks.

As technology has progressed, browsers have been given the capability to recognize and execute a script which is included in a page. This script is, in effect, a browser-executed program which can perform dynamic functions related to the page while it is being downloaded and displayed. Such functions can greatly enhance the usefulness of a web site to both the viewers of its pages and the site developers, and can also provide ways to use the web site and its pages in new ways.

One new and useful application for web sites, given their popularity and familiar viewing procedures, would be to serve as safe and convenient channels for distributing sensitive or proprietary information in obfuscated form to authorized recipients. Such a capability would require web pages with a self-contained capability to display obfuscated information in clear text while being downloaded in accordance with the standards for browser operations.

Although there are other ways to distribute obfuscated documents over networks, recipients can view them only by going beyond the standard and familiar procedures involved in browsing a web site. To view such document files, the recipient must engage in separate decryption-related communications and/or operating procedures, and utilize additional software and/or hardware, all requiring skill and effort beyond that needed for a standard network web site visit. Also, these methods usually obfuscate only entire files, and in some cases require functionality beyond that available in newer, network-specific user devices being introduced to the marketplace.

In my search of relevant prior art to determine whether better methods for distributing sensitive information are being disclosed, I find nothing that proposes using the highly regarded web site for such a task.

SUMMARY

In accordance with my process, a web site visitor is requested to enter one or more keys which are used to identify certain obfuscated portions of pages from that site. As the user downloads and displays the site's pages, decrypted displays of the identified obfuscated page portions are automatically included in sequence with the display of normal page contents.

OBJECTS AND ADVANTAGES

Accordingly, several objects and advantages of my process are to provide a web site which:

(a) is a practical and convenient instrument for distributing obfuscated, sensitive information;

(b) ensures full-time security for the sensitive information by preserving the obfuscation of that information and associated keys at all times;

(c) offers a convenient, one-time key-entry session, if needed, where a site visitor enters keys to control the selection, decryption, and display of sensitive information during the site visit;

(d) sequentially integrates the display of standard site contents and decrypted contents;

(e) allows viewers who are not authorized to display sensitive page portions to view a normal display of all non-obfuscated site contents; and (f) contains any number of obfuscated portions of any size up to that which is allowed for a web page in the HTML standards.

A further object and advantage is to provide a web site where visitors can receive authorization to view the sensitive information by using only standard web site viewing procedures, and are not required to interact with any entity or process beyond those contained in the pages of the web site itself.

Further objects and advantages will become apparent from a consideration of the following descriptions and drawings.

DRAWING FIGURES

In the drawings, closely related figures have the same figure number but different alphabetic suffixes. Also, when it improves the flow of the text in the drawings and hereafter in the specification, a web site HTML document will be referred to as a "page"; an obfuscated portion of a page will be referred to as a "cryptogram"; a viewer-entered, clear-text key will be referred to as a "showkey"; and an obfuscated key that is stored and used in my process will be referred to as either a "key" or "key2", depending on usage. In this specification, these elements are the most frequently mentioned, and the reader will appreciate the use of the shorter reference nomenclature.

FIGS. 1-A and 1-B show the overall structure and content of a page containing my process.

FIG. 2 shows an HTML frameset document.

FIGS. 3-A and 3-B show the flowchart for a controller.

FIGS. 4-A and 4-B show the flowchart for a key handler.

Figure 5:
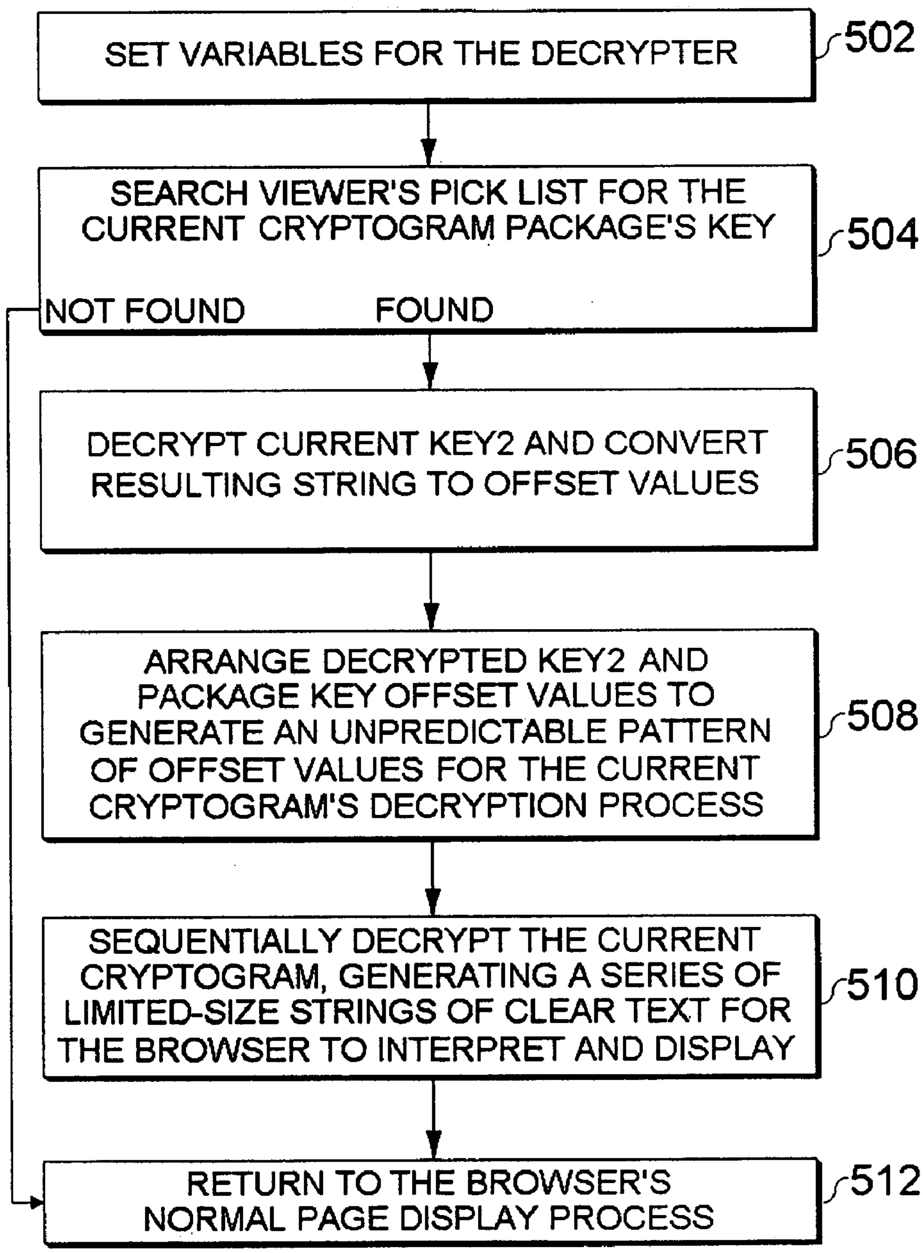
FIG. 5 shows the flowchart for a decrypter.

FIGS. 7-A through 7-G are example listings of pages which contain my process.

DESCRIPTION

My process is embodied in standards-compliant pages according to the figures, descriptions, listings, and instructions in this specification.

Page Organization

FIG. 1-A shows the page 100 organization which results from installing my process in a normal page.

My process comprises three script functions: controller 101, key handler 102, and decrypter 104. These functions require supporting data of two types: a site cryptogram package key list 103 and one or more cryptogram packages 111. The supporting data are also in the form of script statements. All process functions in page 100 are loaded into the browser environment in the normal top-to-bottom sequence, and thus will be ready to operate when the remaining clear page contents 110 and cryptogram packages 111 are downloaded by the browser.

Vertical ellipsis 114 at the bottom of the figure indicates that the mixture of clear page contents 110 and cryptogram packages 111 might be continued further.

FIG. 1-B shows cryptogram package 111 and its component parts in more detail. Call 121 to controller 101 conditionally activates processing for the showkeys which may be input by the web site visitor. Call 121 is made only by the first cryptogram package 111 encountered in each page 100, and will be acted on only once during a web site visit.

Cryptogram 122 is in the form of a script variable, making it available for processing within page 100.

Call 123 to decrypter 104 has three parameters as follows:

(1) a pointer to identify cryptogram 122 by name.

(2) a key which will connect this cryptogram package 111 to a showkey and also will be used to decrypt the following parameter.

(3) a key2 that will be used to decrypt cryptogram 122.

The processing details for cryptogram package 111 will be presented later.

An HTML frameset document 200 is shown in FIG. 2. This type of HTML document is used by web site designers or authors to provide (1) concurrent page frame specifications 201 for the browser so it will display more than one page 100 at a time in separate frames within a single display window, and (2) an implicit inter-page communications directive 202 which tells the browser to provide inter-page data communications between those concurrently displayed pages 100.

A novel use of HTML frameset document 200 in my process establishes inter-page communication for those sites not operating in concurrent page mode.

Overall Process Initialization

FIG. 3-A shows the initialization of my process as page 100 begins to download into the browser environment. First, two reference character sets are established 302 to be used by key handler 102 and decrypter 104 which are described in detail later. The following explanation is to help the reader of this specification fully understand the requirement for the two reference character sets in the functions using them:

Key handler 102 obfuscates showkeys. Decrypter 104 decrypts key2*s* and cryptograms 122. The obfuscation and decryption processes in these two functions are derived from an obvious and well-established scheme which obfuscates by substituting other characters for the real ones in a string of text, and decrypts by exactly reversing the substitutions. Both the obfuscated and clear text strings comprise characters included in the same reference character set which supplies index values for all regular and special characters normally used. The obfuscation method is based on the difference between the index value for each clear-string character and the index value for its obfuscated-string substitute character. The difference between the character indexes is referred to later as an "offset", and in my process there is a key-derived offset value for each obfuscating character.

However, a problem arises from the use of the single reference character set described above because script language syntax strictly governs the placement of certain special characters in stored literal strings. Since site cryptogram package key list 103 and cryptogram package 111 both contain stored literal strings which are obfuscated, a single reference character set scheme would likely cause offending special characters to be misplaced in those strings.

To resolve the above problem, my obfuscation and decryption processes eliminate the use of special characters in obfuscated strings by using two aligned but different reference character sets. The first is a standard and special character set, used for indexing keyboard input and browser display characters; and the second is a standard and alternate-for-special character set, used for indexing keys, key2*s* and cryptograms 122. Examples of the two reference character sets are shown in FIG. 7-A section 302.

To complete the overall initialization, working arrays are set up 304 for key handler 102 and decrypter 104.

Key Entry Control

FIG. 3-B shows the details of controller 101, which is the function for overall control of showkey input, if any, from the viewer. This function is called 121 when the first cryptogram package 111 in each page 100 is loaded.

Working variables are set 305 for this function. It is determined whether showkeys have already been entered for this web site 306. If showkeys have already been entered, this function terminates and returns 316 following its point of call 121 in the first cryptogram package 111.

More working storage arrays are created 308 for key handler 102. A message is displayed 310 to apprise the viewer of the requirement to enter showkeys to view the web site's obfuscated information.

After the viewer acknowledges the message 310, a call is made 312 to key handler 102 to receive a showkey from the viewer. When control comes back to this function 314, it is determined whether a valid showkey was successfully entered and processed by key handler 102. If it was, call 312 to key handler 102 is repeated 314 until showkey entries are terminated by the viewer.

This function returns 316 following its point of call 121 in the first cryptogram package 111.

Cryptogram Package Key List and Showkey Processing

As shown in FIG. 4-A, an array with data is created 402 to establish site cryptogram package key list 103 which will be used in key handler 102.

FIG. 4-B shows the details for key handler 102, a function which inputs and validates showkeys and builds a viewer's pick list for selecting cryptogram packages 111 contained in the web site. Working variables are initialized 404. An input box is displayed 406 for receiving a viewer-supplied showkey for identifying one or more cryptogram packages 111.

It is determined whether the viewer entered a showkey or canceled the input 408. If the input was canceled, this function terminates and returns 410 following its point of call 312 in controller 101 with the message that there is no more input.

If a showkey was entered 408, the function generates offset values for the characters in the showkey and uses them to obfuscate the showkey 412. The resulting key is used as a search argument 414 for site cryptogram package key list 103 that was established earlier 402. If there is no matching key found, the viewer is asked to try again or cancel 416, and key handler 102 starts over again at 404.

If there is an exact match in the list in 414, the viewer is informed that the showkey is accepted; the viewer's pick list is updated with the showkey offset values and corresponding key; and the function returns 418 following its point of call 312 in controller 101 with the message that a valid showkey has been input.

Cryptogram Processing and Displaying

FIG. 5 shows the details of decrypter 104, which is the function for generating a clear-text display of cryptogram 122 and passing it to the browser. When each cryptogram package 111 is encountered during the browser's loading of pages 100, call 123 activates this function with three parameters.

This function first sets up its working variables 502. The key for cryptogram package 111, which is the second call 123 parameter, is then used as a viewer's pick list search argument 504. If the key is not found, this function terminates and returns 512 following its point of call 123 in cryptogram package 111. This results in a continuation of normal browser download and display operations, with no action taken on the calling cryptogram package 111.

If the cryptogram package key is found 504, the associated showkey offset values in the viewer's pick list are used to decrypt key2 506, which is the third call 123 parameter. Offset values are then generated 506 from the resulting string.

The resulting offset values are then divided into sets and combined with offset values from the cryptogram package key 508 to set up the generation of unpredictably changing offset values in the decryption process which follows.

The current cryptogram 122 is identified by the first call 123 parameter. A decrypted version of cryptogram 122 contents is generated and passed to the browser for interpretation and display 510. This transfer to the browser is made with limited-size character strings to eliminate performance problems in certain browsers when creating large displays from script-generated material.

This function returns 512 following its point of call 123 in cryptogram package 111. This results in a continuation of normal browser download and display operations after a clear-text display of cryptogram 122.

Overview of the Process in Operation

Figure 6:
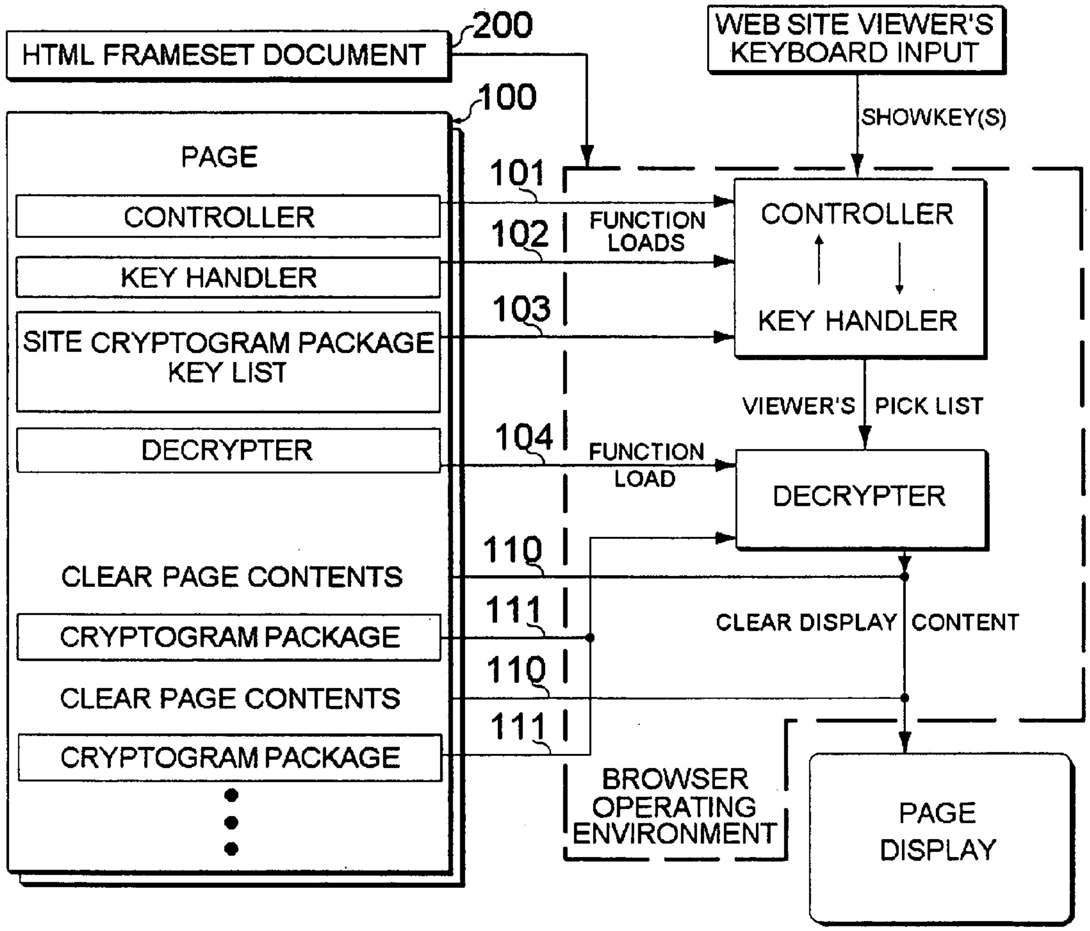
FIG. 6 shows the overall execution of my process.

FIG. 6 diagrams the overall operation of my process in the browser environment and shows the interaction between the elements of my process and the browser as pages 100 are being downloaded and displayed. The diagram shows loading sequence, general processes, and data flow. Function calls and storage management are not explicitly diagrammed.

Upper left is HTML frameset document 200 which, if used, is the first to load during a web site visit. Also shown on the left is one or more instances of page 100 and possibly other site pages which may not contain my process.

As page 100 loads from top to bottom, the first elements of the process to enter the browser environment are: controller 101, key handler 102, site cryptogram package key list 103, and decrypter 104. This assures that the processes are in place and ready to operate when the first cryptogram package 111 is loaded.

As the browser continues loading and displaying clear page contents 110, the loading of the first cryptogram package 111 conditionally triggers the one-time processes in controller 101 and key handler 102 which create the cryptogram package pick list from the web site viewer's showkeys. From that point on, when cryptogram packages 111 in any page 100 are loaded, they activate decrypter 104. If decrypter 104 matches cryptogram packages 111 to the cryptogram package pick list, their cryptograms 122 will be displayed in clear-text along with clear page contents 110.

Script and HTML Listings

FIGS. 7-A through 7-F are a listing of page 100 containing the entire working embodiment of my script language process. This listing is an example of only one page 100 from an existing web site comprising more than one page 100 and other pages. Nevertheless, it can be operated as a single-page demonstration of the objects of my process.

FIG. 7-G is a listing of HTML frameset document 200 which is a working embodiment of an HTML addition to my process when it is part of a web site that is designed to have non-concurrent/non-framed page displays.

For clarity, and in an effort to provide the best level of detail for disclosing my process, I annotated the listings with the same reference numbers used in the flow chart drawings for the same processes. In that way, these comments also cross-reference the listing sections to their corresponding text in the DESCRIPTION. With the above notation in place, the listings are still a true copy of a standards-compliant, operating page 100 containing my process.

To verify the example of my process in FIG. 7-A through FIG. 7-F, one can load it as listed into a browser, and when asked to enter "ViewKeys", enter "cathpaul" and "davelill". Each of these showkeys will enable the clear-text display of a corresponding hyperlink, making a total of four displayed hyperlinks. Without the entry of the above showkeys, only the two non-obfuscated hyperlinks will be displayed.

Constructing the Site—General Considerations

This section of the specification contains information for those who would develop web sites containing my process.

The listing FIGS. 7-A through 7-G show an actual page 100 containing all the script statements in my process. The statements in the listing are shown in the required locations and sequence to operate correctly. Therefor FIGS. 7-A through 7-G will be referenced frequently in this section as a model for constructing sites containing my process.

In actual practice, web site developers would not include the example page material shown at FIG. 7-E, START HTML SECTION through FIG. 7-F, </HTML>, but would use a page they have developed for a planned or existing web site instead. Also the developer would create different keys and cryptograms which are related to their web site instead of those shown in FIG. 7-B,402 and FIG. 7-F, 121–122–123 and 122–123, as explained in the construction steps later.

A site containing my process is constructed by inserting scripts, HTML language, and obfuscated keys and key2s into existing site pages; and also replacing selected portions of those pages with obfuscated and packaged versions of those portions. To support this process, the web site developer provides certain information needed to build each new page 100: (1) the key to be associated with each cryptogram 122 in the new page 100, (2) the locations of the beginning and ending characters of each existing page portion to be converted into a cryptogram 122, and (3) whether HTML frameset document 200 must be added to the site.

Although not required, it would be advantageous for the developer to specify the inputs mentioned above as statements and markers imbedded in each existing site page selected for processing. This would enable a completely automated process for constructing new pages 100 from all the selected pages in an existing web site. Such a process could be developed and operated using state-of-the-art computers and software techniques in accordance with the steps which follow:

Constructing the Site—Site-Level Step (1)

(1) Conduct site-level preparations as follows:

(A) If the existing web site does not already have an HTML frameset document as the first file downloaded by a web site visitor, then open a new file and create HTML frameset document 200 as shown in FIG. 7-G, changing the SRC=name to the name of the first page file to be displayed when the web site is visited.

(B) Using a method equivalent to the one shown in FIG. 7-C section 412, process each showkey to be assigned to a cryptogram 122 in the web site. This will produce for each showkey pass a set of eight offset values crypb[ ] and a key cpass. Save each resulting cpass with its corresponding showkey offsets crypb[ ] for use in later steps.

(C) Open the file for one of the web site's existing pages to be processed, and open an empty sequential file to receive a new page 100.

Constructing the Site—Function Insertion Steps (2)–(5)

(2) Copy the statements from FIG. 7-A first statement through FIG. 7-B section 312–314–316 to the empty new page 100 file.

(3) Construct an array variable statement containing all the cpass keys generated in step (1)(B) as shown in example FIG. 7-B, section 402. Add this statement to the new page 100 file.

(4) Add to the new page 100 file all the statements from FIG. 7-B section 404 down to and including only the comment statement FIG. 7-E, START HTML SECTION.

(5) Add to the new page 100 file the contents of the existing page from its starting point down to, but not including, the first character of the first portion to become a cryptogram 122.

Constructing the Site—Cryptogram Package Steps (6)–(8)

(6) Start setting up the first cryptogram package 111 by adding the <script tag and the cryp00x1( ) function call statement at the beginning of FIG. 7-F section 121–122–123 to the new page 100 file.

(7) Create additional cryptogram package 111 elements that do not yet exist, as follows:

(A) Generate a set of 121 random numbers, each with a value from zero through the length-1 of the reference character string variable cryp0enc in FIG. 7-A section 302. This generated set of random numbers will be referred to later in these instructions as character indexes and offset values, and will also be used in my process as crypb2[ ].

(B) Create a string of 121 characters selected by using the crypb2[ ] offset values from (A) immediately above as their indexes in the reference character set cypt0cl1 in FIG. 7-A section 302.

(C) Using the offset values crypb[ ] from step (1)(B) that have been assigned to this cryptogram package 111, obfuscate the character string created in (B) immediately above, producing a key2. The obfuscation method, expressed as if it were included in the referenced listing, follows:

```
var cryp0enc2= cryp0enc+ cryp0enc;
var string_from__7B ="string_from__7B";
var crypb_from__1B= new Array(crypb[ ]_from__1B);
var key2 =" ";
var n;
for(n=0; n< string_from__7B.length; n++) { key2 +=
  cryp0enc2.charAt(cryp0cl1.indexOf
  (string_from__7B.charAt(n)) + cryp0enc.length –
  crypb_from__1B[n % 8]);
}
```

The key2 produced above will ultimately be used by decrypter 104 in FIG. 7-D section 502.

(D) Again using the offset values crypb[ ] from step (1)(B) and crypb2[ ] from step (7)(A), produce two new sets of offset values cb[ ] and cb2[ ] using a method equivalent to the one shown in FIG. 7-D section 508.

(E) Create a separate string of characters by copying the existing page from its current position at the first character of a portion to be obfuscated, through the last character of that portion. Then, using the supporting data created in earlier steps, create cryptogram 122 for this cryptogram package 111 by obfuscating the string just created. The obfuscation method, expressed as if it were included in the referenced listing, follows:

```
var cryp0enc3= cryp0enc+ cryp0enc+ cryp0enc;
var page_portion="string just created";
var cryptogram=" ";
var n;
for(n=0; n<page_portion.length; n++, pbx=n % 64,
  pbx2=n % 65) {
  cryptogram+= cryp0enc3.charAt
    (cryp0cl1.indexOf (page_portion.charAt(n))+2
    * cryp0enc.length–cb[pbx]–cb2[pbx2]);
}
```

(8) Complete the insertion of the current cryptogram package 111 into the new page 100 file by using the FIG. 7-F section 122–123 as a model and doing the following:

(A) Create a string variable statement containing cryptogram 122 from step (7)(E) in the same format as the var cryptxt2 statement. The variable name must be unique within page 100. Add this statement to the new page 100 file.

(B) Create a call statement to the cryp00x2 decrypter 104 as shown, using the variable name from (A) immediately above as the first parameter; using the cpass key generated in step (1)(B) that is assigned to this cryptogram package 111 as the second parameter; and using the key2 generated in step (7)(C) as the third parameter. Add this statement to the new page 100 file.

(C) Add the </script tag to the new page 100 file.

Constructing the Site—Completing the Page Steps (9)–(10)

(9) From the existing page, starting with the character immediately following the last character used in creating cryptogram 122 in step 7(E), copy the existing contents to the new page 100 file, stopping either after the character preceding the first character of another portion to be obfuscated into another cryptogram 122, or at the end of the existing page, whichever is the case.

(10) If another portion is to be obfuscated into another cryptogram 122:

(A) Using FIG. 7-F section 122–123 as a model, add the <script tag to the new page 100 file.

(B) Go back to step (7) to continue processing the existing page.

Otherwise,

Constructing the Site—Completing the Web Site Steps (11)–(12)

(11) Since the end of the existing page has been reached:

(A) Close the files on the existing page and new page 100.

(B) If there are more existing pages to be processed in the web site, open the next existing page to be processed and an empty sequential file to be the next new page 100, and go to step (2) to continue processing.

Otherwise,

(12) Gather into a common directory: all the new pages 100, the new HTML frameset document 200 if a new one was created, the web site's unprocessed pages, and the supporting web site files; perform operational tests; upload those web site files to the server that are necessary for network operations; and, if necessary, distribute the site-related showkeys to web site visitors authorized to have them.

Constructing the Site—Technical Precautions

Due to variances in the way that different browsers operate, and also because of changes in the HTML standards that have not yet been accommodated in all existing browsers, it is possible for site developers to select page portions for conversion to cryptograms 122 in such a way that some browsers will not handle them properly when decrypted for display. Such problems usually have more to do with the "look" of displays than the actual information to be displayed, but should be avoided.

To ensure the proper operation of my process in the largest possible number of browsers, site developers should follow the precautionary instructions below regarding the content and scope of those portions of pages that they select to become cryptograms.

(1) Use only standard, browser-recognized characters in the matching reference character sets and in portions to be obfuscated. This is a good rule for standard site development anyway.

(2) If a portion is to contain any part of a major page structure definition, it should contain all of it. For example, a portion must include the "<TABLE . ." tag and the "</TABLE>" tag for that same table if anything between the tags is contained in that portion.

(3) Precaution (2) also applies to executable content, but there is usually no reason to obfuscate this.

(4) For technical reasons, some tags which may be included in a page header cannot be included in a portion, but for networking reasons, the header should not be obfuscated anyway.

(5) A portion should not contain anything which dynamically generates HTML or provides setup information for the browser during the loading process.

(6) A portion cannot contain any HTML whose absence would cause display problems if it is not selected by a viewer for decryption and display. This will always apply to any browser.

As more browsers become standard, some of the precautions above may not be needed. But until then, a practical and easy rule to follow would be to focus on the obfuscation of hyperlinks, image loading tags, and formatted text of the developer's choice; all at the top level of indention in page 100. This would provide protection for any type of sensitive information that one might want to send over a network.

Finally, there is a standard reminder—names of the variables and functions in newly added scripts such as my process should be checked for unwanted duplication of any names already used in other script or HTML statements within the same existing page.

Site Operations

This section of the specification is for those who visit web sites containing cryptograms and actually download a page containing one. Web site visitors who do not encounter cryptograms will experience only normal operations.

Since the operation of my process is totally automatic, there are no "operating steps" in the normal sense. The only process-related task on the part of a site visitor who might initiate my process is to respond to the one-time prompt to enter the showkeys which he or she might wish to use for the site.

A standard browser input box is automatically displayed to receive the showkey(s) that are input by the viewer. As each showkey is entered, either an acceptance message is displayed, or the viewer is told that there is trouble with the showkey entry and the input box is displayed again.

After all desired showkeys are entered, or if none is entered, the downloading and displaying of any page in the site will require only standard procedures, whether or not cryptograms are loaded or displayed.

CONCLUSIONS, RAMIFICATIONS, AND SCOPE

Accordingly, the reader will see that my invention allows sensitive information to be included with the other content that a web site can broadly and conveniently distribute over a network, with additional advantages to the site developer and visitor in that there can be different types of sensitive information in the cryptograms within the same page or web site, and specific information can be targeted to different authorized recipients by providing them with different showkeys;

a single showkey can be associated with more than one cryptogram;

the sensitive information is made secure by obfuscation that is permanent, regardless of how site pages are transmitted, stored, or processed;

a cryptogram can represent as little as a single character or as much as an entire page of text;

web site visitors are asked only once to enter their particular showkeys for the entire site, and this is done only if it becomes necessary during the site visit;

web site visitors interact only with a page when entering showkeys;

web site visitors receive instant verification of each valid showkey as it is entered; and cryptograms which are authorized for decryption are displayed in a seamless sequence with standard page contents.

Although the description above contains many specifically defined features and elements, this should not be construed as limiting the scope of the invention but as merely providing an illustration of the presently preferred embodiment of this invention. For example, showkey and key2 lengths can be different, resulting in different obfuscation strengths; cryptogram packaging can be different; the matching reference character sets can be different; viewer messages can be different, etc. All of these differences can, in turn, require different script language statements for the associated processes.

Thus the scope of the invention should be determined by the appended claims and their legal equivalents, rather than by the examples given.

I claim:

1. A method for decrypting a plurality of cryptograms which are placed within each web site HTML document in a plurality of web site HTML documents that are being downloaded from a web site by a viewer that is visiting said web site, comprising:

(a) providing said plurality of web site HTML documents, (b) providing said plurality of cryptograms within each said web site HTML document, (c) providing the data within each said web site HTML document for validating a plurality of viewer-entered clear-text keys for said plurality of cryptograms, (d) providing an HTML frameset page for enabling data communications between said web site HTML documents, (e) providing a key handler function within each said web site HTML document for receiving and validating said plurality of viewer-entered clear-text keys, comprising:

(i) providing a first means for sending an input request to said viewer, and (ii) providing a second means for receiving said plurality of viewer-entered clear-text keys directly into said web site HTML document, (f) providing a controller function within each said web site HTML document for activating and controlling said key handler function as needed, and (g) providing a decryption function within each said web site HTML document for generating a plurality of decrypted versions of said plurality of cryptograms that correspond to said plurality of viewer-entered clear-text keys that have been received and validated.

2. The method of claim 1 wherein said plurality of decrypted versions will be made available for display in the original locations of said plurality of cryptograms.

3. The method of claim 1 wherein said plurality of cryptograms are any size up to the size allowed by HTML standards for the body of said web site HTML document.

4. The method of claim 1 wherein said viewer receives a validity report directly from said decryption function upon entry of each of said plurality of viewer-entered, clear-text keys.

5. The method of claim 1 wherein said plurality of viewer-entered clear-text keys are made available to each said web site HTML document in said plurality of web site HTML documents as each is being displayed.

* * * * *